United States Patent [19]

Chaisson

[11] Patent Number: 5,396,998
[45] Date of Patent: Mar. 14, 1995

[54] SLIDE VALVE AND BAG FOR PACKAGING PRODUCTS

[76] Inventor: Maurice Chaisson, 46 Brek Dr., Merrimack, N.H. 03054

[21] Appl. No.: 150,876

[22] Filed: Nov. 12, 1993

[51] Int. Cl.6 .................. B65D 81/04; B65D 85/30; F16K 3/00
[52] U.S. Cl. .................. 206/522; 251/297; 251/329; 383/3
[58] Field of Search ............ 251/297, 326, 319, 329; 206/522; 383/3

[56] References Cited

U.S. PATENT DOCUMENTS

| | | | |
|---|---|---|---|
| D. 133,038 | 7/1942 | Lion | D11/164 |
| 1,994,962 | 3/1935 | Rushfeldt | 206/423 X |
| 2,049,030 | 7/1936 | Strauss | 206/820 X |
| 2,152,648 | 4/1939 | Jones | D11/153 |
| 2,355,559 | 8/1944 | Renner | D11/152 |
| 2,373,634 | 4/1945 | Wagner | 206/813 X |
| 2,472,677 | 6/1949 | Phillips | 251/297 X |
| 2,641,299 | 6/1953 | Bloom et al. | D11/152 |
| 3,104,498 | 9/1963 | Miller | D11/143 |
| 3,198,484 | 8/1965 | Martindale | 251/329 |
| 3,358,961 | 12/1967 | Montgomery | 251/329 X |
| 3,398,501 | 8/1968 | Aninger | 206/522 X |
| 3,414,140 | 12/1968 | Feldkamp | 206/522 |
| 3,447,222 | 6/1969 | Bunch et al. | 251/329 X |
| 4,300,312 | 11/1981 | Weder et al. | 47/72 |

FOREIGN PATENT DOCUMENTS

| | | | |
|---|---|---|---|
| 161005 | 4/1933 | Switzerland | 47/72 |
| 439197 | 8/1976 | U.S.S.R. | 251/326 |

*Primary Examiner*—Bryon P. Gehman
*Attorney, Agent, or Firm*—Edward R. Hyde

[57] ABSTRACT

A slide valve adapted to be secured to a flexible container and having an open position and a closed position. The valve comprises a body member and a slide. In the open position openings in the body and slide coincide. In the closed position an air tight seal is provided. The valve is constructed to have two discreet positions and a sealing ring on the slide that engages the body member to effect the air tight seal.

6 Claims, 2 Drawing Sheets

SLIDE VALVE AND BAG FOR PACKAGING PRODUCTS

BACKGROUND OF THE INVENTION

1. Field of the Invention

The present invention relates to a slide valve and more particularly to such a valve used on a thin envelope or bag that is employed as an inflatable void filling packaging bag.

A recent development in the field of packaging is the use of inflatable bags for filling voids between the packaged product and the sides of the package container. These inflatable bags take the place of styrofoam packing material and have distinct advantages over the use of such solid packing material. Foremost among the advantages is that the inflatable bags contain much less bulk than the prior material and are reusable.

The inflatable bag or envelope requires a simple, dependable and inexpensive valve to permit inflation and deflation of the packing bag. The present invention is directed to a valve meeting these requirements and in addition is of flat construction to readily fit within any package along with its associated bag.

2. Description of the Prior Art

There exists a considerable number of valve-type devices for plastic bags a representative example being U.S. Pat. No. 4,739,902. These prior valves are customarily bulky and associated with extended nozzles which serve purposes other than that of a valve for a packing bag of the type herein described. They lack the simplicity and reliability of a valve having two discreet positions, open and closed.

The present invention meets the needs of inflatable void filling packing material which the more cumbersome prior art valves lack.

SUMMARY OF THE INVENTION

Against the foregoing background it is a primary object of the present invention to provide a slide valve having a minimum number of parts and of reliable and simple construction for securing to an inflatable envelope or bag that may be of plastic material.

A further object of the present invention is to provide an efficient slide valve that is of a flat, thin design to be secured to an inflatable envelope used for packing material.

It is a still further object of the present invention to provide a slide type valve having two predetermined discreet positions and adapted to be secured to an inflatable envelope.

Accordingly, the present invention contemplates a slide valve having a slotted body mender and a slide member received in the slot. Both members have openings that when aligned premit the associated bag to be inflated or deflated. The slide may be manually movable between an open postion wherein the openings are aligned and a closed position.

BRIEF DESCRIPTION OF THE DRAWINGS

The foregoing and still other objects of the present invention will be more apparent from the following detailed explanation of the preferred embodiments of the invention considered in connection with the accompanying drawings herein in which.

DESCRIPTION OF A SPECIFIC EMBODIMENT

Figure 1:
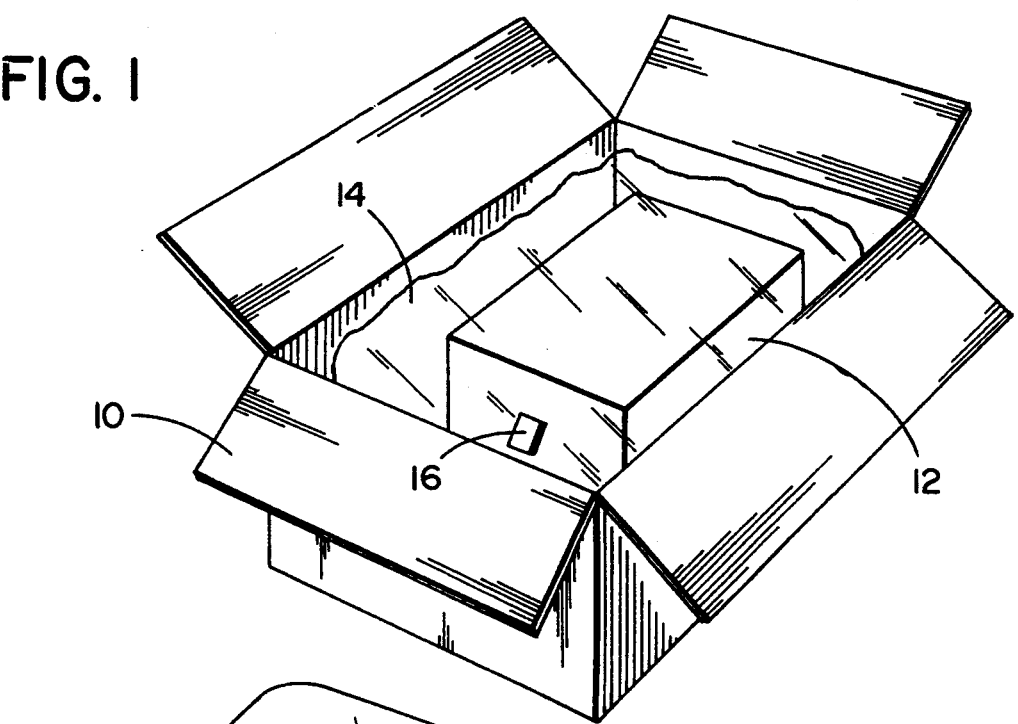
FIG. 1 is a perspective view of a void filling bag in place in a package.
Figure 2:
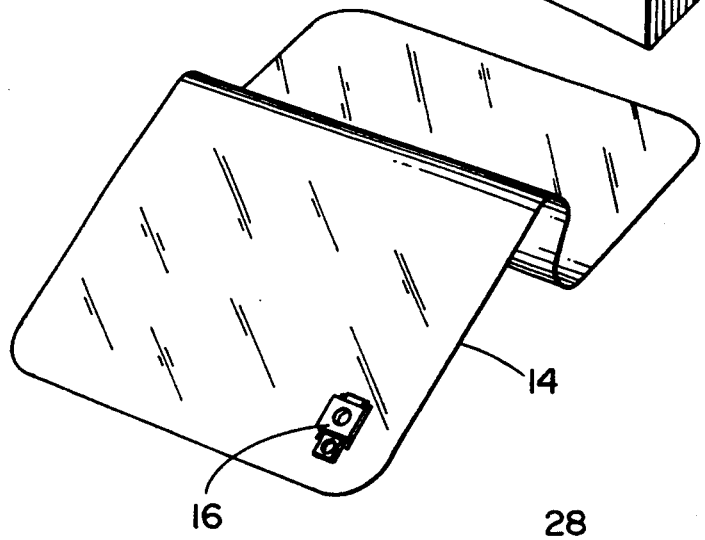
FIG. 2 is a perspective view of an inflatable bag with the slide valve mounted thereon.

Referring now to the drawings and more particularly to FIG. 1, there is shown a carton 10 within which there is packaged a product 12 for shipment, In order to retain the product in position and prevent movement and possible damage to it the void between the inner sides of the carton 10 is filled by an inflatable bag 14 having a valve 16, After the product is placed into the carton, the deflated bag or envelope 14 is tucked around the product 12 and the envelope is thereupon inflated through the valve 16 to essentially fill the space within the carton and prevent damage to the product 12 that is being shipped. The valve may be inflated by any suitable mefchanism which may be automatic in operation, Such mechanism is not herein shown and does not form part of the present invention. FIG. 2 shows a partially inflated bag 14 which may be made of any convenient material such as a thin film plastic and has the valve 16 secured to the outer surface by an appropriate cement material.

Figure 3:
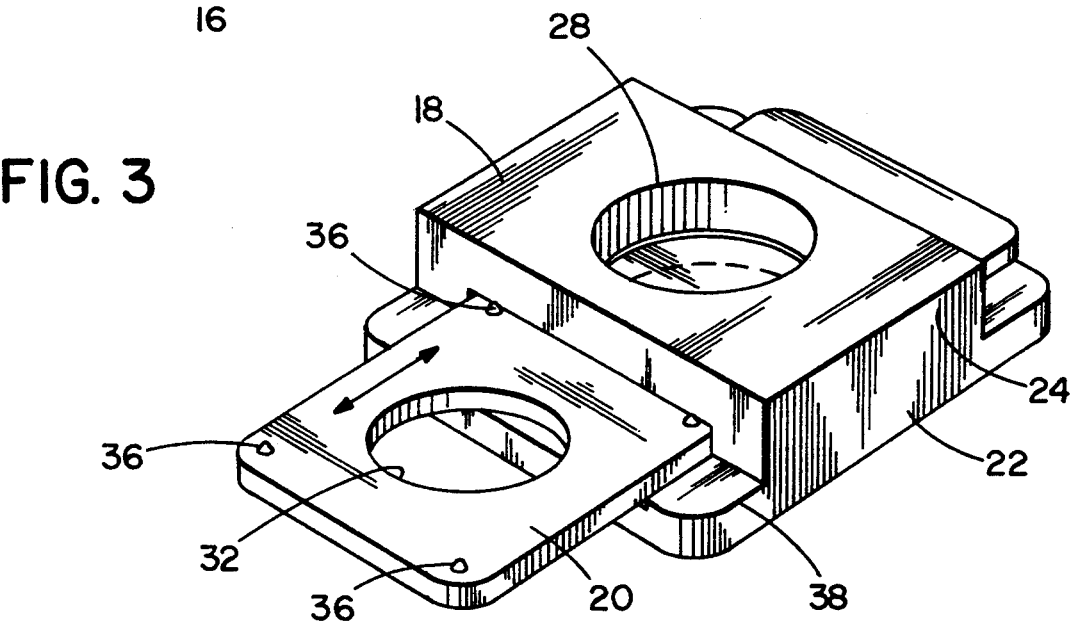
FIG. 3 is a perspective view of the slide valve in the closed position.
Figure 4:
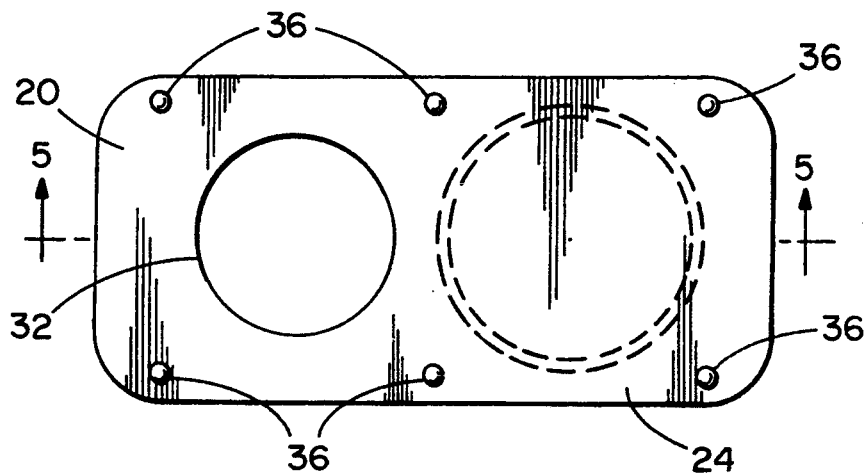
FIG. 4 is a view of the valve slide.

Referring now to FIGS. 3 and 4, there is shown the construction of the valve mechanism of the present invention. It is seen that the valve is made of two sections, a body 18 and slide member 20. The body has a base portion 22 and a somewhat narrower boss 24 which is slotted as at 26. Aligned circular openings 28, 30 pass through the base 22 and boss 24 of the body member.

The slide member 20 is received in the slot 26 in a tight, snug fit. A circular opening 32 passes through the slide member and is of approximately the same diameter as openings 28, 30 in the body member.

As seen more clearly in FIG. 4, the slide member is divided into two portions in which the forward portion contains the opening 32 and on the rearward portion a raised lip 34 which may be a molded integral portion of the slide member. Six projections 36 are provided in the upper surface of the slide member and spaced as shown. The longitudinal distance between corresponding projections 36 is approximately equal to the width of boss 24 of the body member 22. In this manner the slide member may be moved between two discreet positions within the slot 26 and retained in the positions by the projections 36 bearing against the boss portion 24. FIG. 3 shows the valve in the closed position in which the circular lip 34 presses firmly against the under surface of the boss base 22. This provides a tight seal preventing the escape of air within the plastic envelope. The projections 36 determine the position of the slide member as it is moved from one position to the other.

Figure 5:
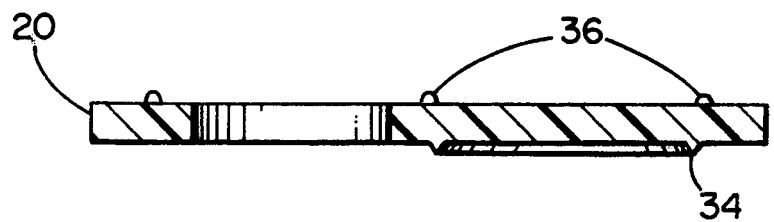
FIG. 5 is a sectional view taken on the line 5—5 of FIG. 4.
Figure 6:
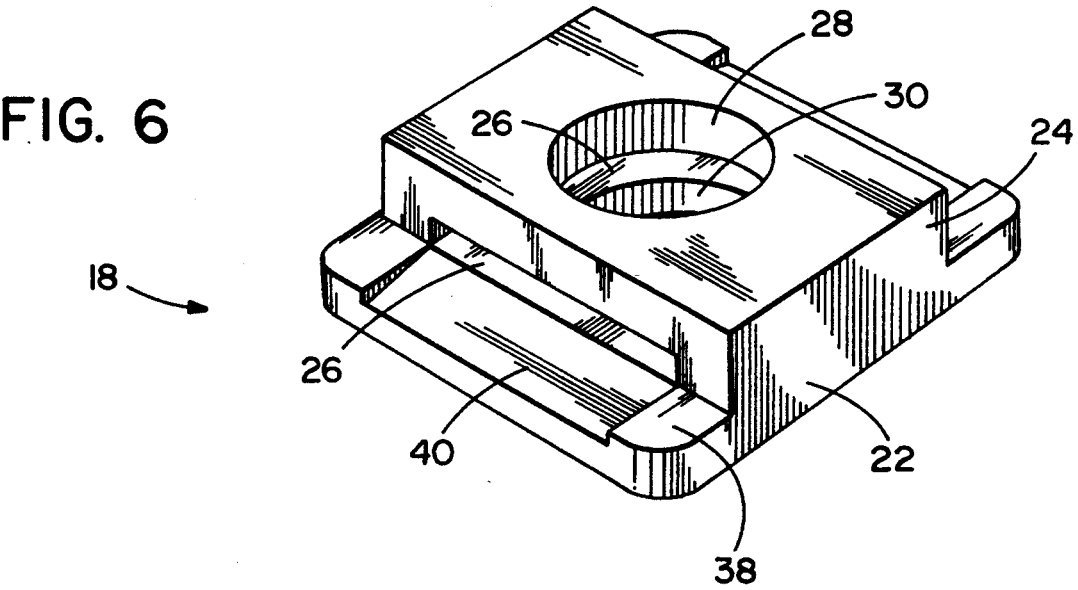
FIG. 6 is a perspective view of the valve body.

As is apparent from FIG. 5, the lip 34 is raised with respect to the under surface of slide member 20. Thus with the slide member 20 in the orientation shown in the drawings, the raised lip 34 depends from the under surface of the slide member and contacts the upper surface of base 22 within the slot 26. Thus throughout the present specification, the term "raised lip" is used with respect to the under surface of slide member 20.

In order to facilitate the assembly of the slide member into its slot 26, one of the projections such as 38 of base member 22 has an angled or ramp portion 40. Thus the slide member with its circular lip may be conveniently and readily inserted into the slot.

Both the body 18 and slide member 20 of the valve may be molded of a material such as nylon to provide a non-corrosive assembly. The under surface of the body 22 is secured to the envelope in any convenient manner as by cementing. The envelope, of course, has an opening to correspond with opening 30 of the valve.

Having thus described the invention with particular reference to the preferred form thereof, it will be obvious that various changes and modifications may be made therein without departing from the spirit and scope of the invention as defined in the appended claims.

What is claimed is:

1. A slide valve having an open position and a closed position comprising:
    a body member comprised of a base and a boss formed of a single unitary structure;
    said base having a first opening passing therethrough;
    said boss having a second opening passing therethrough;
    said first and second openings being aligned;
    said boss having a slot passing therethrough perpendicular to the axis of said first and second openings the slot defining an underside surface of the boss and an upper surface of the base;
    a slide member located within said slot having a forward portion and a rearward portion;
    the forward portion of the slide member having an opening passing therethrough;
    the rearward portion of the slide member having a raised lip extending from the undersurface thereof;
    means defining a first position of the slide member witin the slot in which the opening in the forward portion thereof is substantially aligned with the said first and second openings so that the valve is in the open position; and
    means defining a second position of the slide member within the slot in which the said raised lip on the rearward portion thereof bears against the upper surface of the base surrounding the first opening to close the said first opening whereby the valve is in the closed position.

2. The slide valve set forth in claim 1 in which the said first opening is circular; and
    said raised lip is circular and of a greater diameter than the first opening.

3. The slide valve set forth in claim 2 in which a portion of the base is angled to facilitate insertion of the said slide member in the said slot.

4. A slide valve having an open position and a closed position comprising;
    a body member having an opening passing therethrough;
    said body member having a slot passing therethrough;
    a slide member located in said slot;
    said slide member having an opening therein;
    means defining a first slide position wherein the opening in the slide member is aligned with the opening in the body member so that the slide member is in the open position;
    means defining a second slide position wherein the slide member covers the opening in the body member so that the slide member is in the closed position;
    the opening in the body member being circular; and
    a raised lip on the under surface of the slide member adapted to seal the opening in the body member when the slide member in is the second slide position.

5. The slide valve set forth in claim 4 in which a portion of the base base is angled to facilitate insertion of the said slide member in the said slot.

6. A void filling device for a package container comprising;
    an inflatable bag adapted to fill the unused space within a container for a packaged product;
    a slide valve having a body member comprised of a base and a boss;
    the under surface of the base being secured to said inflatable bag in an air tight seal;
    said base having a first opening passing therethrough;
    said boss having a second opening passing therethrough;
    said first and second openings being aligned;
    said boss having a slot passing therethrough perpendicular to the axis of said first and second openings, the slot defining an underside surface of the boss and an upper surface of the base;
    a slide member having a forward position and rearward position located within said slot;
    the forward portion of the slide member having an opening passing therethrough;
    the rearward portion of the slide member having a raised lip extending from the under surface thereof;
    means defining a first position of the slide member within the slot in which the opening in the forward portion thereof is substantially aligned with the said first and second openings so that the valve is in the open position; and
    means defining a second position of the slide member within the slot in which the said raised lip on the rearward portion thereof bears against the upper surface of the base to close the said first opening so that the valve is in the closed position.

* * * * *